May 29, 1956 P. W. HAAS, JR 2,747,398
VISCOSITY METER
Filed July 23, 1953

INVENTOR
PETER W. HAAS JR.
BY George Lipkin
   [signature]
ATTORNEYS

2,747,398

VISCOSITY METER

Peter William Haas, Jr., Scranton, Pa.

Application July 23, 1953, Serial No. 369,977

4 Claims. (Cl. 73—56)

(Granted under Title 35, U. S. Code (1952), sec. 266)

The invention described herein may be manufactured and used by or for the Government of the United States of America for governmental purposes without the payment of any royalties thereon or therefor.

This invention relates to viscosity meters and more especially to viscosity meters of the impact type.

It is an object of this invention to provide a viscosity meter which indicates the viscosity of a liquid quickly.

It is another object of this invention to provide a rugged viscosity meter suitable for field use.

It is a further object of this invention to provide a direct reading viscosity meter.

Other objects and advantages of the invention will hereinafter become more fully apparent from the following description of the annexed drawing, which illustrate a preferred embodiment, and wherein.

Figure 1:
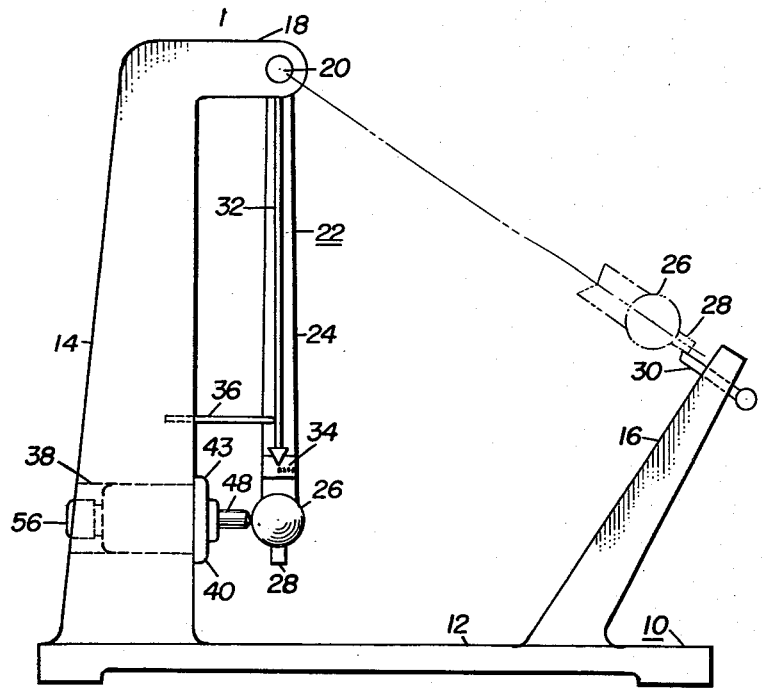
Fig. 1 is a side elevational view of the viscosity meter of this invention.
Figure 2:
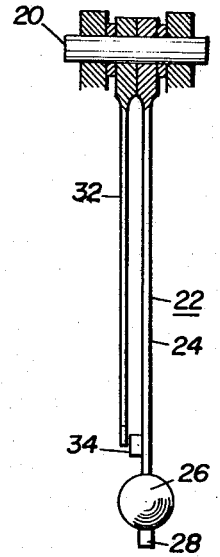
Fig. 2 is a front elevational view of the hammer and pointer of Fig. 1.

Referring now to the drawings for a description of the invention, reference numeral 10 designates a frame having a base 12, an upright column 14, and a diagonal supporting arm 16. The upper end of the column 14 terminates in a forwardly extending fork 18 and has a horizontal pin 20 journaled therein.

A pendulum like hammer 22 having a shaft 24 and a spherical head 26 is tightly affixed at its upper end to the pin 20. The hammer head 26 carries a projection 28 at its lower end which projection 28 is adapted to be engaged by a sliding latch pin 30 located in the upper end of the diagonal supporting arm 16.

A pointer 32 is frictionally secured to the pin 20 to rotate therewith unless restrained. A scale 34 is affixed to the shaft 24 of the hammer 22 and is located opposite the lower end of the pointer 32. A stop rod 36 is affixed to the column 14 and projects to the right as viewed in Fig. 1 to arrest the motion of the pointer 32.

The lower end of the column 14 is provided with a horizontal bore 38 in which a cylinder 40 may be inserted. The cylinder 40 comprises a cylindrical casing 42 having an external shoulder 43 and an internal cylindrical bore 44. A piston 46 is adapted to slide in the cylindrical bore 44 and is provided with a piston rod 48 which extends through an opening 50 in an end wall 51 of the cylinder casing 42. The opposite end wall of the casing 42 is provided with a channel orifice 52. A replaceable frangible diaphragm 54 closes the orifice 52 and is held in place by a cap 56 which screw-threadedly engages the casing 42. The cap 56 has a central opening 58 which registers with the orifice 52.

Figure 3:
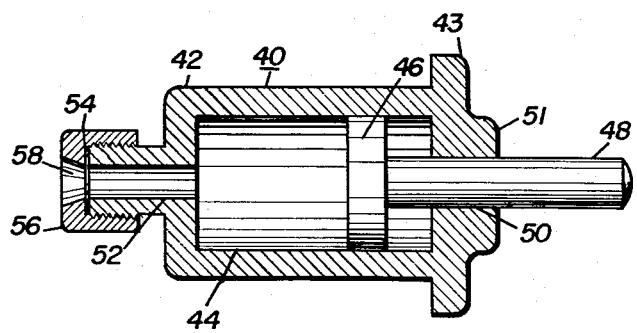
Fig. 3 is a sectional view of the cylinder of this invention.

The operation of the device is as follows. The piston is moved to its extreme right hand position as viewed in Fig. 3, the cylinder 40 tipped up and filled completely with the liquid, the viscosity of which is to be determined. The frangible diaphragm 54 is then placed over the orifice 52 and secured in place by the cap 56.

The cylinder 40 is thereupon inserted into the bore 38 at the base of the column 14 and the viscosity meter leveled (by means not shown) so that the head 26 of the hammer 22 just touches the end of the piston rod 48 when the hammer 22 hangs down vertically as shown in Fig. 1. The pointer 32 is then moved to just touch the stop rod 36 as also shown in Fig. 1. The hammer 22 and pointer 32 are thereafter swung to the right as viewed in Fig. 1, and the latch pin 30 raised to engage the projection 28 on the bottom of the hammer 22 to hold the same in an elevated position.

The sliding pin 30 is thereupon withdrawn allowing the hammer 22 to swing downwardly and strike the piston rod 48. The impact of the hammer 22 on the piston rod 48 causes it and the piston 46 to move to the left as viewed in Fig. 1 and Fig. 3, compress the oil in the cylinder 40 and orifice 52, rupture the frangible diaphragm 54, and force a portion of the oil out through the orifice 52.

In doing this, the hammer 22 swings to the left of the vertical position shown in Fig. 1 a distance proportional to the quantity of oil forced out of the cylinder 40, but the travel of the pointer 32 is arrested by the stop rod 36 so that the scale 34 moves relative to the pointer 32. The pointer 32 will retain its relative position on the scale 34 due to the frictional engagement with the pin 20 so that a reading of the position of the pointer 32 on the scale 34 can be made at leisure after the hammer 22 has come to rest.

The quantity of liquid forced from the cylinder 40 during this test is a measure of the viscosity of the liquid therein, and accordingly, so is the travel of the piston rod 48 and the displacement of the pointer 32 on the scale 34. The latter may be calibrated to read directly in viscosity numbers.

It will be apparent from the above that this invention provides a quick acting viscosity meter which also gives a direct reading of the viscosity of the liquid being tested.

Obviously many modifications and variations of the present invention are possible in the light of the above teachings. It is therefore to be understood that within the scope of the appended claims the invention may be practiced otherwise than as specifically described.

What is claimed is:

1. A meter for determining the viscosity of a liquid, said meter comprising a frame, an elongated gravity actuated impact member journaled at one of its ends in said frame to swing therein from an upper position to a lower-most position and beyond said lower-most position, said lower-most position being the position which said member assumes when supported solely by said journaling, a support for releasably retaining said member in said upper position, a cylinder adapted to contain said liquid, a piston in said cylinder, a piston rod on said piston, an orifice in said cylinder, said cylinder being so secured in said frame that said impact member strikes said piston rod to drive said piston towards said orifice when said member swings beyond said lower-most position, whereupon said liquid is forced at least in part from said cylinder through said orifice, and means for indicating the distance that the piston travels when said piston rod is struck by said weighted member.

2. The meter defined in claim 1 where in a replaceable frangible element closes said orifice, said element being readily ruptured by said liquid when said impact member strikes said piston rod.

3. A viscosimeter which comprises an upright frame having a base portion and spaced therefrom an arm portion, a receptacle for viscous material supported by the frame and disposed adjacent the base portion, force transmitting means having a portion extending laterally of the frame and a portion movable within the receptacle to displace the viscous material, an orifice in the receptacle for the passage of the displaced material, force applying means pivotally mounted on said arm portion of the frame for moving the force transmitting means, scale means carried by the force apply means, an indicator arm carried by the frame and actuated relative to the scale, upon movement of the force transmitting means, to indicate the distance travelled by the force transmitting means as a measure of the viscosity of the material.

4. A viscosimeter which comprises an upright frame having a lateral arm extending from its upper end portion, a receptacle for viscous material supported by the lower end portion of the frame, a movable force transmitting member having a portion extending generally parallel with said lateral arm and a portion arranged for movement within the receptacle for displacing viscous material from the receptacle through an orifice in the receptacle, force applying means pivotally mounted on the lateral arm, said force applying means being operative during its pivotal movement to actuate the force transmitting means, cooperating scale and indicator means, one of said cooperating means being fixedly mounted relative to the frame and the other cooperating means being pivotally supported by the lateral arm, said other cooperating means being adapted to move with the force applying means and relative to the fixedly mounted cooperating means whereby the degree of movement of the force transmitting means by the force applying means is indicated by the relative positions of the cooperating scale and indicator means as a measure of the viscosity of the materials in the receptacle.

References Cited in the file of this patent

UNITED STATES PATENTS

| | | |
|---|---|---|
| 880,991 | Von Hassel | Mar. 3, 1908 |
| 1,329,192 | McAdam | Jan. 27, 1920 |
| 1,470,806 | Burke | Oct. 16, 1923 |
| 2,066,016 | Rossi et al | Dec. 29, 1936 |
| 2,076,592 | Rhodes | Apr. 13, 1937 |
| 2,526,832 | Smith | Oct. 24, 1950 |

FOREIGN PATENTS

| | | |
|---|---|---|
| 18,241 | Great Britain | Aug. 12, 1907 |
| 718,593 | Germany | Mar. 16, 1942 |
| 289,419 | Switzerland | July 1, 1953 |